Feb. 8, 1938. J. DELVINIOTTI 2,108,010
CLOCKWORK SYSTEM
Original Filed Aug. 17, 1934 2 Sheets-Sheet 1
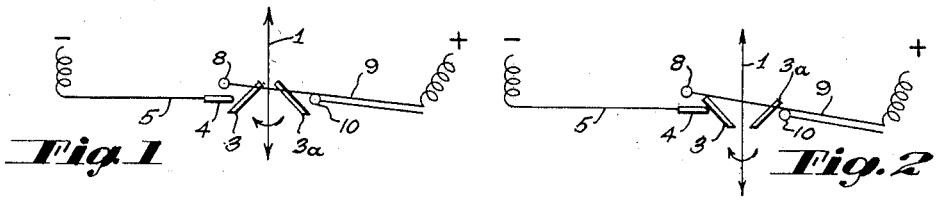
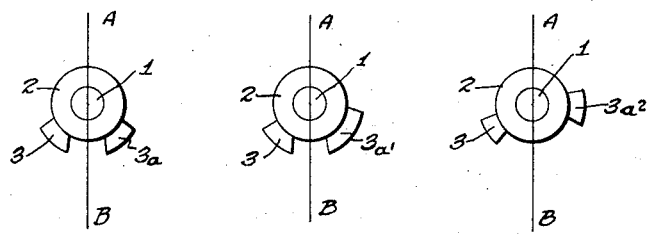
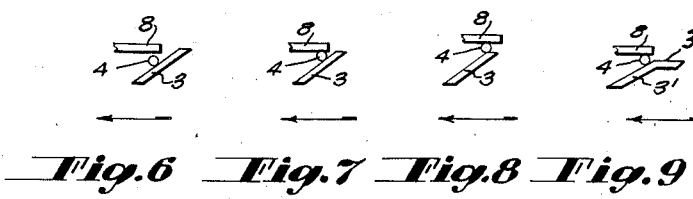
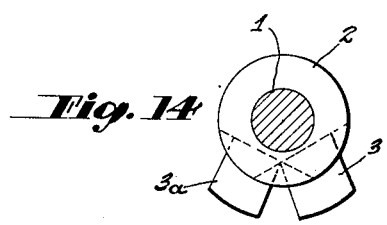
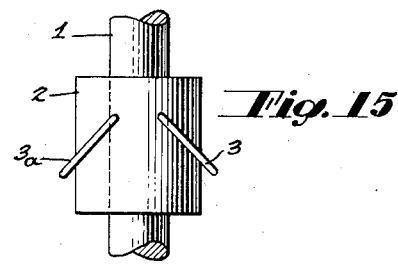
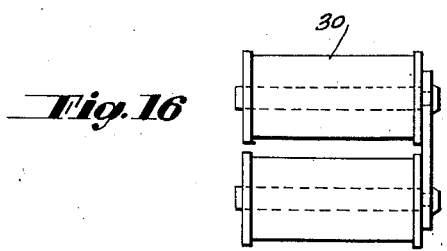
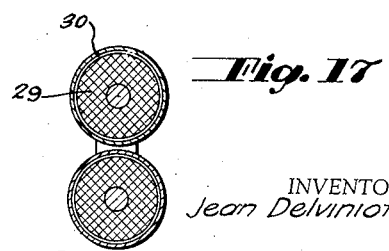
INVENTOR.
Jean Delviniotti
BY
ATTORNEY.

Feb. 8, 1938.        J. DELVINIOTTI        2,108,010
CLOCKWORK SYSTEM
Original Filed Aug. 17, 1934    2 Sheets-Sheet 2
Fig. 10
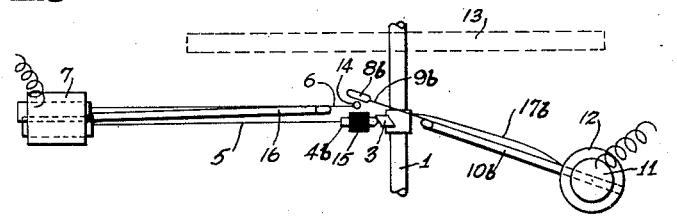
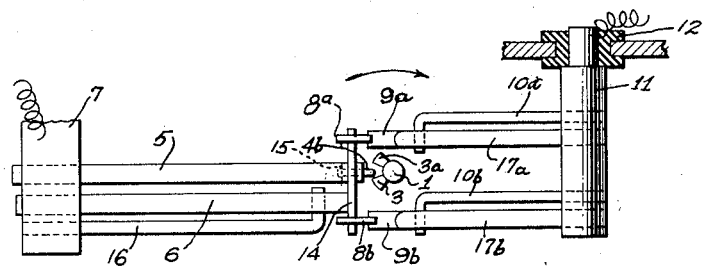
Fig. 11
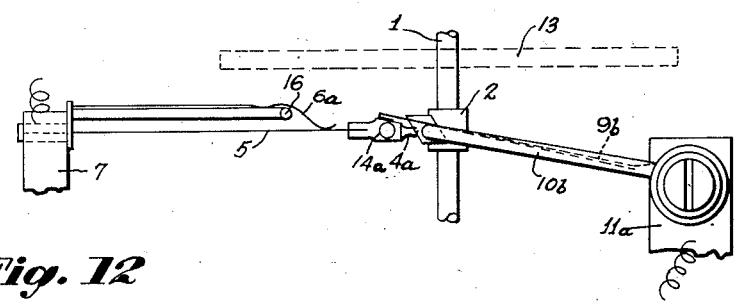
Fig. 12
Fig. 13
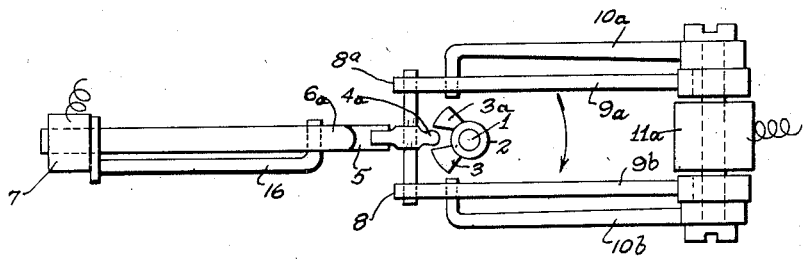
INVENTOR.
Jean Delviniotti
BY
ATTORNEY.

Patented Feb. 8, 1938

2,108,010

UNITED STATES PATENT OFFICE 2,108,010

CLOCKWORK SYSTEM

Jean Delviniotti, Paris, France

Application August 17, 1934, Serial No. 740,291.
Renewed July 22, 1937. In France September 5, 1933

13 Claims. (Cl. 58—28)

The present invention relates to a system of electric contacts which can be used in connection with any circular balance in a clockwork mechanism, so as to ensure the formation of magnetic circuits of any kind whatever.

This device can be so devised as to ensure at will either one or two closings of the electric circuit in either one or both of the directions of oscillation of the balance.

Another object of the present invention is to provide a device of the type above referred to in which it is possible to angularly fix at will the point, or points, of contact with respect to the arc described by the balance and to give these contacts the duration (or angular length) that is necessary for the most efficient working of the device.

Still another object of the present invention is to provide a device of this kind in which the resistance opposed to the movement of the balance is as small as possible.

An important feature of the device according to the present invention is the fact that the points at which the electric circuit is made or broken are positioned remote from the operating means of the circuit breaking device.

Still another important feature is the shape and arrangement of the organs of this device, as will be hereinafter described.

Finally, another feature is the particular means provided according to the present invention for protecting the points of contact against the breaking spark of the extra-current.

Preferred embodiments of the present invention will be hereinafter described, with reference to the accompanying drawings, given merely by way of example, and in which:

Figs. 1 and 2 are diagrammatical views illustrating the operation of the system of contacts as the balance is oscillating;

Figs. 3, 4, and 5 are plan views of three different embodiments of the device carried by the balance of the clockwork;

Figs. 6, 7, 8, and 9 are diagrammatical views illustrating several different positions of the contact device;

Fig. 10 is an elevational view of a system according to the present invention in which the points of contact are located at a relatively great distance from the mechanical part of the device that actuates these contacts;

Fig. 11 is a plan view of the device of Fig. 10;

Figs. 12 and 13 are a plan view and an elevational view respectively of a modification of the device according to the present invention;

Figs. 14 and 15 are a plan view and an elevational view respectively of the spindle of the balance fitted with its inclined controlling surfaces;

Figs. 16 and 17 show, in elevation and in cross section respectively, an arrangement for protecting the contacts, as applied to an electromagnet cooperating with the device.

The contacting device which is the object of the present invention is of the type in which the spindle 1 of the balance of the clockwork mechanism carries, in a sleeve 2, two inclined pallets such as 3 and 3a in Figure 1, of a suitable profile. A post 7, connected with the mass of the clockwork carries a blade 5 which is very flexible and a counterblade 6 serving to prevent blade 5 from vibrating. The end of blade 5 carries a member 4 made of a material well adapted for making an electric contact.

The other terminal of the electric circuit is connected to a blade 9 resting upon a support 10. This blade 9 carries at its end a member 8 made of a material well adapted to making an electric contact.

Referring, for instance, to Fig. 1, it will be seen that when spindle 1 pivots in the direction of the arrow, inclined pallet 3 moves member 4 in an upward direction, so that said member comes into contact with member 8 and closes the electric circuit.

When this inclined pallet 3 has moved past member 4, the contact opens. Then inclined pallet 3a moves member 4 without making the contact. When the balance is moving in the opposite direction, the same operations will take place, but in the reverse order. Inclined pallet 3a first moves member 4 in an upward direction, thus making the contact, and pallet 3 moves said member 4 in a downward direction without establishing any contact.

In the arrangement diagrammatically illustrated by Fig. 2, when spindle 1 rotates in the direction of the arrow, inclined pallet 3 first moves members 4 in a downward direction without establishing any contact; then inclined pallet 3a strikes member 4 and brings it into contact with member 8.

The contacting device of the present invention is such as to permit the placing of the pallets in such relation during the course of manufacture or assembly as to accurately fix the time and duration of each contact.

Fig. 3 shows, by way of example, an embodiment in which the two inclined pallets 3 and 3a above referred to serve to establish a contact which is symmetrical and of the same duration for both directions of oscillation of the balance. Fig. 4 shows two inclined pallets 3 and $3a^1$ disposed for establishing symmetrical contacts for both directions of oscillation of the balance, but with a duration of the contact greater for one direction of oscillation than for the other.

Finally, Fig. 5 shows two inclined pallets 3 and $3a^2$ arranged for making contacts that are dissymmetric for both directions of oscillation of the balance.

Referring to Fig. 6, it will be seen that when the end 4 of blade 5 is just coming into contact with one of the inclined pallets 3, 3a, the electric contact is not immediately made. It is only after a certain displacement (Figs. 7 and 8) that inclined pallet 3 pushes member 4 against contact member 8 and thus makes a satisfactory electric contact. Fig. 9 shows that the length over which the contact is closed or the duration of the contact can be prolonged by horizontally prolonging the top part of pallet 3', as indicated at 32, without involving an increase of the frictional stresses.

In the embodiments of the invention that have been described up to now, the member 4 of the contacting device that cooperates with the inclined pallets 3 and 3a also acts as the contacting member itself.

In the embodiments of Figs. 10, 11, 12, and 13, the members 4b and 4a that cooperate with the inclined pallets in question and which are fixed at the end of flexible blade 5 do not come into contact with the member 8 carried by the end of flexible blade 9. In these embodiments, given by way of example, the electric contact is closed by a pin 14 disposed at right angles to said blade.

In the embodiment of Figs. 10 and 11, piece 4b, which cooperates with inclined pallets 3 and 3a, carries a sleeve 15 of an electrically insulating material adapted to bear against a metal rod 14 carried by flexible blade 6, which acts as a counterblade and bears upon a stationary support 16. Two flexible blades 9b and 9a, carrying at their ends contacting members 8b and 8a of a suitable metal, are mounted on a support 11, electrically insulated by means of a sleeve 12. This support 11 also carries two rigid rods 10b and 10a on which said blades 9b and 9a are resting. Counterblades 17b and 17a may be mounted on the same insulated support 11.

Referring to Figs. 10 and 11, it will be seen that the spindle 1 of the oscillating balance, when it rotates in the direction of the arrow, brings inclined pallet 3 into contact with member 4b, which is fixed at the end of flexible blade 5 and moves it upwardly, so that pin 14, which is fixed at the end of the flexible counterblade 6, is also moved in an upward direction. In the course of this displacement pin 14 is brought into contact with members 8b and 8a, which are fixed at the ends of blades 9b and 9a, respectively, and are applied against counterblades 17b and 17a. The electric circuit is now closed. When member 4b moves past inclined pallet 3, it is released and the electric circuit is again opened.

Owing to this arrangement, the rise of temperature due to the spark of the extra-current will be transmitted but to a very limited degree to member 4b and, consequently, the lubrication of this member 4b, which is rendered necessary by its working continuously in cooperation with inclined pallets 3 and 3a; will not be impaired, since the lubricant will not be subjected to a relatively high temperature at which it might lose its efficacy. On the other hand, due to the fact that the points of contact of pin 14 with members 8b and 8a are at a relatively great distance from the end of member 4b that cooperates with the inclined pallets 3 and 3a, the lubricant that is applied on these inclined pallets cannot spread as far as these points of contact where it would interfere with the flow of the current. Finally, as blades 9b and 9a are placed at the same distance from the axis of member 4b, no torsional movement can take place during their upward movement.

As the spindle 1 of the oscillating balance further moves after the drop of member 4b, inclined pallet 3a now comes into contact with this member, which is moved downwardly. In the course of this movement, the insulating sleeve 15 comes out of contact with pin 14, which is maintained in position because blade 6 at the end of which it is fixed is applied against its support 16.

When inclined pallet 3a releases member 4b, sleeve 15 comes back into contact against pin 14.

It will be readily understood that the position occupied by pin 14, when the latter is in the position of rest, is perfectly well defined, because the blade 6 which carries this pin is then applied against support 16, the position of which is fixed.

In the embodiment of Figs. 12 and 13, which is particularly applicable to clockworks of small size, member 4a, which corresponds to member 4, directly carries the contacting pin 14a, while blade 6a, which corresponds to blade 6, acts merely to damp vibration in the blade 5.

In this embodiment counterblades 17b and 17a have been done away with and blades 9b and 9a are slightly bent and are arranged to rest upon supporting rods 10b and 10a. These blades 9b and 9a and the rods 10b and 10a are mounted on the support 11a.

All these improvements can be applied to the circuit breaking devices illustrated by Figs. 1 and 2, 3, 4, and 5, whatever be the time at which the contact or contacts take place.

Figs. 14 and 15 show an embodiment of the inclined surfaces.

In the metal core 2 are provided two saw cuts adapted to receive, according as the case may be, either one or two inclined members 3 and 3a, made of a suitable material, such as metal, hard stone, bakelized cardboard or fabric, etc.

Figs. 16 and 17 show how the contacts can be protected against injuries that might result from the spark produced by the self induction current.

According to this arrangement, each coil 29 of the electro-magnet will be covered with an envelope 30 of a metal that is a good conductor of electricity.

With such an arrangement, the self induction of the coils will be absorbed by the metallic mass that surrounds them, when the contact is broken and consequently this will avoid, to a considerable degree, the injurious effects of the spark of the self induction current.

While I have, in the above description, disclosed what I deem to be practical and efficient embodiments of the present invention, it should be well understood that I do not wish to be limited thereto as there might be changes made in the arrangement, disposition and form of the parts, without departing from the principle of my invention as comprehended within the scope of the appended claims.

What I claim is:
1. In a clockwork system including an electric circuit, a device for controlling said circuit which comprises, in combination, an elastically mounted contact in said circuit, another elastically mounted contact in said circuit adapted to cooperate with said first mentioned contact for closing said circuit, an oscillating spindle actuated by said clockwork system, and two inclined pallets rigid with said spindle and adapted to actuate said second mentioned contact and close the circuit for each oscillation of said spindle, the inclined pallets being dissymmetrically positioned with respect to said second mentioned contact when the spindle is in its mid-position of oscillation.

2. In a clockwork system including an electric circuit, a device for controlling said circuit which comprises, in combination, a pair of contacts both connected to the same terminal of said circuit, a pin electrically connected to the other terminal of said circuit and elastically mounted for cooperation with both of said contacts simultaneously, a member adapted to control the engagement of said pin with said contacts, an oscillating spindle actuated by said clockwork system, and two inclined pallets rigid with said spindle adapted to actuate said member for each oscillation of said spindle in either direction respectively, for the purpose of periodically engaging and disengaging the pin with said contacts.

3. In a clockwork system including an electric circuit, a device for controlling said circuit which comprises, in combination, a pair of contacts both connected to the same terminal of said circuit, a pin electrically connected to the other terminal of said circuit, an elastic blade supporting said pin for cooperation with both of said contacts simultaneously, a member bearing against said pin so as to control the position thereof, another blade adapted to elastically support said member, an oscillating spindle actuated by said clockwork system, and two inclined pallets rigid with said spindle and adapted to act on said member for each oscillation of said spindle in either direction respectively.

4. In a clockwork system including an electric circuit, a device for controlling said circuit which comprises, in combination, a pair of contacts both connected with the same terminal of said circuit, a pin electrically connected to the other terminal of said circuit and elastically mounted for cooperation with both of said contacts simultaneously, a member rigidly connected with said pin, an oscillating spindle actuated by said clockwork system, and two inclined pallets rigid with said spindle adapted to act on said member for each oscillation of said spindle in either direction respectively.

5. A device according to claim 2 in which said spindle is provided with two inclined slots in which said inclined pallets are inserted.

6. In a clockwork system including an electric circuit, a device for controlling said circuit which comprises, in combination, an elastically mounted contact in said circuit, another elastically mounted contact in said circuit adapted to cooperate with said first mentioned contact for closing said circuit, an oscillating spindle actuated by said clockwork system, and two inclined pallets rigid with said spindle and adapted to act on said second mentioned contact for each oscillation of the spindle, said inclined pallets being of different lengths from one another.

7. In a clockwork system including an electric circuit, a device for controlling said circuit which comprises, in combination, two contacts in said circuit and at least one of which is movably mounted to engage with and disengage from the other, an oscillating spindle actuated by the clockwork system and two pallets having inclined surfaces and rigid with said spindle to act on said movable contact for each oscillation of the spindle in either direction respectively, at least one of said pallets being provided with a surface normal to the axis of the spindle and forming a continuation of the inclined surface of such pallet.

8. In a clockwork system including an electric circuit, a device for controlling said circuit which comprises, in combination, an oscillating spindle actuated by the clockwork, two inclined pallets rigid with said spindle to oscillate therewith, a member projecting into the path of the pallets and movably mounted to be shifted in a direction substantially longitudinally of the spindle through engagement and disengagement with the pallets, a relatively stationary contact included in the circuit and spaced longitudinally of the spindle from said member, and another electrical contact interposed between the first mentioned contact and said member and normally free from engagement with the former and in the path of movement of the latter to be shifted by the latter into engagement with the first mentioned contact.

9. In a clockwork system including an electric circuit, a device for controlling said circuit which comprises, in combination, two contacts included in the circuit and one of which is movable into and out of engagement with the other, a member positioned on the side of the movable contact away from the other contact and mounted for movement to engage the movable contact and force it into engagement with the other contact, an oscillating spindle actuated by the clockwork system, and two inclined pallets rigid with said spindle and adapted to actuate said member to engage the movable contact with the other contact for each oscillation of the spindle in either direction respectively.

10. In a clockwork system including an electric circuit, a device for controlling said circuit which comprises, in combination, a plurality of spaced apart relatively stationary contacts, a current carrying bridge mounted for movement into and out of engagement with said stationary contacts collectively, means for normally retracting said bridge from engagement with the contacts, and means for moving said bridge into engagement with said contacts, said latter means including a bridge operating member, an oscillating spindle actuated by said clockwork system, and two inclined pallets rigid with said spindle and adapted to actuate said member to engage the bridge with the spaced contacts for each oscillation of said spindle in either direction respectively.

11. In a clockwork system including an electric circuit, a device for controlling said circuit which comprises, in combination, a plurality of elastically mounted relatively stationary contacts included in the circuit, an elastically mounted relatively movable contact in said circuit adapted to cooperate with the relatively fixed contacts collectively for closing said circuit, an oscillating spindle actuated by said clockwork system, and two inclined pallets rigid with said spindle and adapted to move said relatively movable contact into engagement with the stationary contacts for each oscillation of said spindle in either direction respectively.

12. In a clockwork system including an electric circuit, a device for controlling said circuit which comprises, in combination, a plurality of elastically mounted relatively stationary contacts included in the circuit, an elastically mounted relatively movable contact in said circuit adapted to cooperate with the relatively fixed contacts collectively for closing said circuit, an oscillating spindle actuated by said clockwork system, and two inclined pallets rigid with said spindle and adapted to move said relatively movable contact into engagement with the stationary contacts for each oscillation of said spindle in either direction respectively, and means for damping vibration of the elastically mounted relatively movable contact.

13. In a clockwork system including an electric circuit, a device for controlling said circuit which comprises, in combination, normally spaced apart contacts in said circuit, and means for bringing said contacts into engagement with one another comprising an oscillating spindle actuated by the clockwork system and provided with inclined slots, and inclined pallets mounted in said slots in normally rigid relation with respect to the spindle.

JEAN DELVINIOTTI.